UNITED STATES PATENT OFFICE.

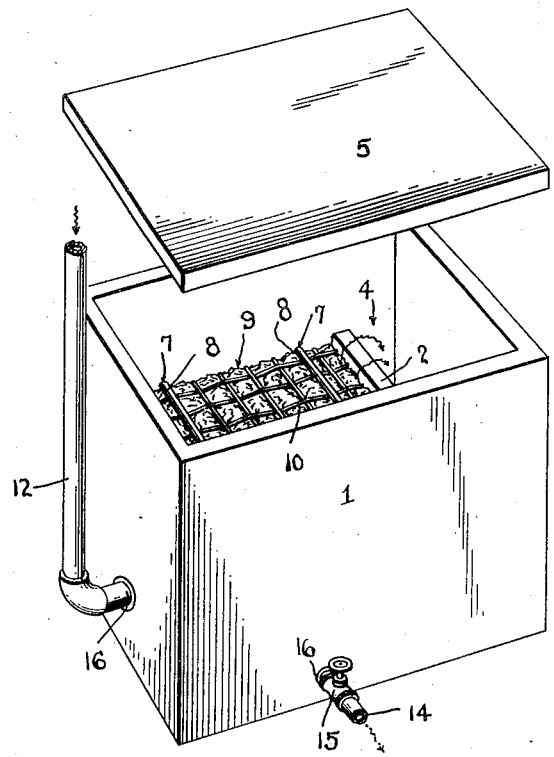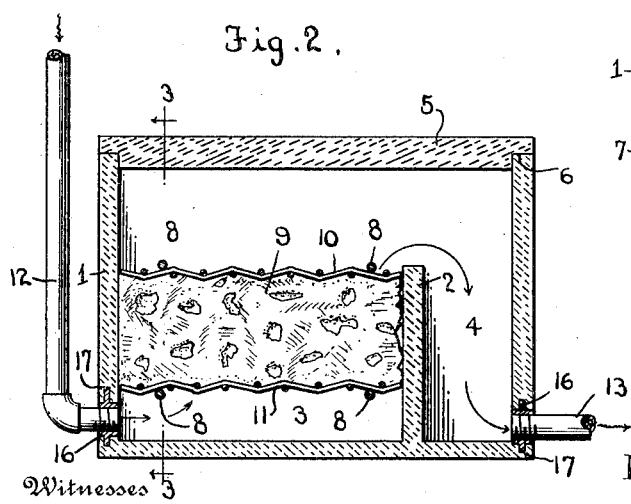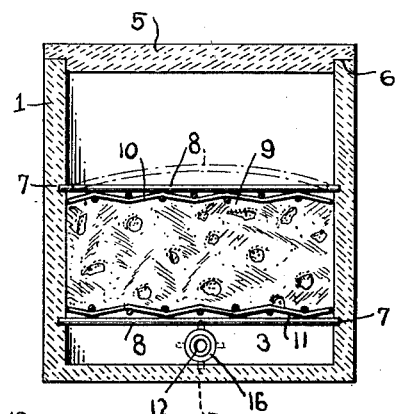

MARION JACKSON, OF TIPPECANOE CITY, OHIO.

WATER-FILTER.

1,083,883. Specification of Letters Patent. Patented Jan. 6, 1914.

Application filed May 15, 1913. Serial No. 767,850.

*To all whom it may concern:*

Be it known that I, MARION JACKSON, a citizen of the United States, residing at Tippecanoe City, in the county of Miami and State of Ohio, have invented certain new and useful Improvements in Water-Filters; and I do declare the following to be a full, clear, and exact description of the invention, such as will enable others skilled in the art to which it appertains to make and use the same.

This invention relates to improvements in water filters.

One object of the invention is to provide a water filter having an improved means for removably holding the filtering material in place in the body of the filter whereby the material may be readily taken out and cleaned and replaced when necessary.

Another object of the invention is to provide a water filter having a one-piece body thus obviating any possibility of leakage through seams or joints.

With these and other objects in view the invention consists of certain novel features of construction, and the combination and arrangement of parts as will be more fully described and claimed.

In the accompanying drawings: Figure 1 is a perspective view of my improved filter with the cover raised therefrom; Fig. 2 is a central vertical section thereof; Fig. 3 is a cross sectional view of the same taken on the line 3—3 of Fig. 2.

My improved filter comprises a one-piece body portion 1 which may be formed of any suitable material but which is preferably constructed of concrete and which is absolutely impervious to water and is non-porous, so that the walls thereof will not absorb any impurities and may be readily and thoroughly cleaned.

Formed in the body 1 near one end thereof is a transverse partition 2 which extends upwardly a suitable distance above the bottom and divides the body of the filter into a filtering compartment 3 and a filtered water compartment 4.

The body 1 may be of any suitable shape and is here shown as being rectangular and as having a flat cover 5 which is preferably constructed from the same material as that from which the body is formed and which is provided around its side edges with a right angular recess 6 which receives the upper edge of the sides of the body 1 and permits the cover to form a close air and dust-tight engagement with the top of the body.

Formed at diametrically opposite points in the inner surfaces of the side walls of the body of the filter in line with the upper edge of the partition 2 and at points a suitable distance above the bottom of the filtering compartment 3 are recesses or sockets 7 with which are engaged the ends of spring metal rods 8 which are provided to support the filtering material 9 which is arranged in the compartment 3 and which is preferably in the form of a sponge. The filtering material or sponge 9 is confined between upper and lower screens 10 and 11 or pieces of coarse wire netting. The upper screen 10 is arranged beneath the upper supporting rods 8 while the lower screen 11 rests on the lower rods as is clearly shown in Figs. 2 and 3 of the drawings. When thus arranged it will be seen that the sponge or filtering material 9 is supported at a suitable distance above the bottom of the compartment 3 and that a water supply space is formed between the filtering material and the bottom of the compartment. As hereinbefore stated the rods 8 are formed of spring metal and when engaged with the sockets 7 are bowed as shown in dotted lines in Fig. 3 of the drawings and are thus sprung into position as will be readily understood.

Connected with one end of the body 1 of the filter and opening into the water supply space in the bottom of the filtering compartment is a water supply pipe 12, while connected with the opposite end of the body 1 and opening into the lower portion of the filtered water compartment 4 is a filtered water discharge pipe 13. Also connected with one side of the body 1 and opening into the space below the filtering material in the filtering compartment is a cleanout pipe 14 having therein a valve 15 as shown. The pipes 12, 13 and 14 have a detachable fluid-tight connection with the body of the filter by means of interiorly threaded bushings 16 which are embedded in the material of which the body 1 is formed and which are provided with radially projecting anchoring lugs 17 which securely hold the bushings in place.

In the operation of my improved filter the water enters the lower portion of the filtering compartment 3 beneath the filtering material 9 and filters or percolates upwardly through the filtering material and flows over the partition 2 into the filtered water compartments 4, from whence it passes through the discharge pipe 13 in a pure or perfectly filtered condition. The sediment in the water when thus filtered settles in the bottom of the filtering compartment beneath the filtering material and may be readily removed therefrom through the cleanout pipe 14 as will be understood.

Various changes in the form, proportion, and the minor details of construction may be resorted to without departing from the principle or sacrificing any of the advantages of the invention as claimed.

Having thus described my invention, what I claim is:

A filter of the character described comprising a one-piece body portion having a partition extending upwardly a suitable distance from the body thereof and dividing the body into a filtering and a filtered water compartment, said filtering compartment having in its sides upper and lower series of sockets, spring metal rods adapted to be sprung into said sockets, screens engaged with the inner sides of said rods, a filtering material arranged between said screens and supported thereby and by said lower series of rods above the bottom of the filtering compartment, a supply pipe and a cleanout pipe connected with said filtering compartment below the filtering material, a discharge pipe connected with said filtered water compartment and interiorly threaded bushings arranged in the sides of the body to receive said pipes whereby they are detachably connected with the filter.

In testimony whereof I have hereunto set my hand in presence of two subscribing witnesses.

MARION JACKSON.

Witnesses:
RAYMOND A. KERR,
PHOEBE RATCLIFF.

Copies of this patent may be obtained for five cents each, by addressing the "Commissioner of Patents, Washington, D. C."